United States Patent
Pasala et al.

(10) Patent No.: US 9,324,059 B2
(45) Date of Patent: Apr. 26, 2016

(54) METHOD FOR PROVIDING CONTEXT AWARE ACCESS IN GLOBAL SOFTWARE PROJECT MANAGEMENT

(75) Inventors: Anjaneyulu Pasala, Bangalore (IN); Arun Sethuraman, Chennai (IN); Niranjani Srinivasa Vibhu, Dharmapuri (IN); Ravi Prakash Gorthi, Bangalore (IN)

(73) Assignee: Infosys Technologies, Inc., Bangalore (IN)

( * ) Notice: Subject to any disclaimer, the term of this patent is extended or adjusted under 35 U.S.C. 154(b) by 1074 days.

(21) Appl. No.: 13/325,329

(22) Filed: Dec. 14, 2011

(65) Prior Publication Data

US 2012/0317195 A1     Dec. 13, 2012

(30) Foreign Application Priority Data

Apr. 7, 2011    (IN) ........................... 1209/CHE/2011

(51) Int. Cl.
    *G06F 15/16*      (2006.01)
    *G06Q 10/10*      (2012.01)

(52) U.S. Cl.
    CPC .......... *G06Q 10/109* (2013.01); *G06Q 10/1093* (2013.01)

(58) Field of Classification Search
None
See application file for complete search history.

(56) References Cited

U.S. PATENT DOCUMENTS

| | | | |
|---|---|---|---|
| 8,200,520 B2 * | 6/2012 | Chen | G06Q 10/06312 705/7.18 |
| 8,694,585 B2 * | 4/2014 | Turner et al. | 709/204 |
| 8,825,509 B2 * | 9/2014 | Yerkes | G06Q 10/06 705/7.18 |
| 2006/0031326 A1 * | 2/2006 | Ovenden | G06Q 10/109 709/206 |
| 2007/0021997 A1 * | 1/2007 | Hayes, Jr. | G06Q 10/1095 705/7.19 |
| 2008/0147469 A1 * | 6/2008 | Murillo et al. | 705/9 |
| 2008/0162247 A1 * | 7/2008 | Hurmola | G06Q 10/109 705/7.21 |
| 2008/0177611 A1 * | 7/2008 | Sommers | G06Q 10/1095 705/7.19 |
| 2008/0294483 A1 * | 11/2008 | Williams | G06Q 10/063116 705/7.16 |
| 2009/0281860 A1 * | 11/2009 | Bhogal et al. | 705/8 |
| 2011/0125545 A1 * | 5/2011 | Lehmann | G06Q 10/00 705/7.24 |

* cited by examiner

*Primary Examiner* — Thomas Dailey
(74) *Attorney, Agent, or Firm* — LeClairRyan, a Professional Corporation

(57) ABSTRACT

A method and system for managing communication between a plurality of team members are provided. The method includes, at a first agent associated with a team member, receiving inputs from a team member about an event associated with one or more team members. The method further includes sending an event request to agents of one or more team members and receiving responses from them. Based on the responses, the first agent either cancels the event, schedules the event, or reschedules the event.

21 Claims, 6 Drawing Sheets

METHOD FOR PROVIDING CONTEXT AWARE ACCESS IN GLOBAL SOFTWARE PROJECT MANAGEMENT

This application claims the benefit of Indian Patent Application Filing No. 1209/CHE/2011, filed Apr. 7, 2011, which is hereby incorporated by reference in its entirety.

FIELD OF THE INVENTION

The present invention relates, generally, to managing communication efficiently between globally distributed team members of a project and, more specifically, to provide context aware access in management of a project.

BACKGROUND

In today's world of globalization, organizations operate from branches located in multiple countries and cities across the world. To make the best use of resources and available talent, organizations prefer acquiring local talent in every country they have offices located. This strategy helps them reduce costs and acquire diversified talent; however, coordinating work across teams located at different parts of the world becomes a challenge. This is especially true in the case of software development organizations, in which a single project may involve people from different countries.

In particular, project managers usually find it difficult to manage communication between their team members located at different locations. For example, if one of the team members is based out of US and the other members are based out of different locations in India, it may become challenging for a project manager located in the UK to coordinate with them. If, for example, the project manager wants to schedule a call with his/her team, he/she will first have to check calendars of each team member to determine their availability (provided the calendars of all the team members are connected to a central server and the project manager has exclusive permissions to access their calendars), calculate the time difference between the three countries and send them meeting invites for a call at a suitable time.

Specifically, there are several issues associated with the scenario mentioned above. Firstly, there is a manual labor involved in checking in everyone's calendars, estimating the time for the call based on the time difference, and sending the invites. Considering that these processes are done manually, chances of human error are considerable. For example, the project manager may make a mistake in calculating time difference between the three geographical locations.

Another issue associated with sending meeting invites for a call is that responses to the invites must be received before the call is scheduled. To understand this point clearly, consider a scenario where an important team member is unable to check his/her emails or calendar on time. In this case, he/she may miss out on sending response (either acceptance or rejection) to the sender before the call and the sender may go ahead and schedule the call without even knowing the availability of the important team member. This may create unnecessary trouble for all the attendees of the call, and the call may have to be rescheduled at the last moment.

Usually people are not able to respond to meeting invites sent to them because of varied reasons. Examples of these reasons include, but are not limited to, not being present on their work stations due to different work hours when a meeting request is received or loss of network connection, e.g., while driving or due to some technical problem.

In light of the above, a system and a method are required by which communication between team members can be handled effectively and which overcomes the limitations mentioned above.

SUMMARY OF THE INVENTION

According to an embodiment of the present invention, a method for managing communication between a plurality of team members is provided. The method includes, at a first agent associated with a first team member, receiving inputs from the first team member for an event associated with one or more team members of the plurality of team members. The method also includes sending an event request to each agent associated with the one or more team members. Further, the method includes receiving one or more responses from each agent associated with a subset of team members from the one or more team members.

The method further includes cancelling the event when an agent associated with a predetermined team member sends a reject response and rescheduling the event when a predefined number of reject requests are received. In accordance with an embodiment of the present invention, the rescheduling is performed based on the responses received from one or more team members. The method also includes scheduling the event when at least one of the predefined criterion is satisfied.

According to another embodiment of the present invention, a method for managing communication between a plurality of team members is provided. The method includes, at a first agent associated with a first team member, receiving inputs from the first team member for an event associated with a second team member of the plurality of team members. The method also includes sending an event request to a second agent associated with the second team member.

The method includes, at the second agent associated with the second team member, sending the response to the first agent when the event request is received by the second agent. In accordance with an embodiment of the present invention, the response is based on the availability of the second team member and a priority of the event.

The method includes, at a server agent, queuing the event request from the first agent when the second agent is in an offline mode. The method also includes sending the event request to the second agent when the second agent starts operating in an online mode. Lastly, the method includes queuing a response from the second agent when the first agent is in the offline mode and sending the response to the first agent when the first agent starts operating in the online mode.

According to yet another embodiment of the present invention, a system for managing communication between a plurality of team members is provided. The system includes an agent associated with a first team member. The agent includes a receiver configured to receive inputs from the first team member for an event associated with one or more team members of the plurality of team members and to receive responses from each agent associated with a subset of team members from one or more team members. The agent also includes a transmitter configured to send an event request to each agent associated with one or more team members. The agent further includes a scheduler configured to cancel the event when an agent associated with a predetermined team sends a reject response, schedule the event when at least one of the predefined criterion is satisfied, or reschedule the event when a predefined number of reject requests are received. The rescheduling is performed based on responses received from one or more team members.

According to yet another embodiment of the present invention, a system for managing communication between a plurality of team members is provided. The system includes a first agent associated with a first team member, a server agent, and a second agent associated with a second team member. The first agent includes a first receiver to receive inputs from the first team member for an event associated with the second team member. The first agent also includes a first transmitter to send an event request to the second agent.

The server agent includes a memory to store the event request from the first agent when the second agent is in an offline mode and a second transmitter to send the event request to the second agent when the second agent starts operating in an online mode.

The second agent includes a third transmitter to send a response to the server agent when the event request is received by the second agent from the server agent.

According to yet another embodiment of the present invention, a computer program product for use with a computer is provided. The computer program product includes a computer-usable medium having a computer-readable program code for managing communication between a plurality of team members. The computer program code includes, at a first agent associated with a first team member, program instructions to receive inputs from the first team member for an event associated with one or more team members of the plurality of team members. The computer program code further includes program instructions to send an event request to each agent associated with the one or more team members and program instructions to receive one or more responses from each agent associated with a subset of team members from the one or more team members. The computer program code also includes program instructions to cancel the event when an agent associated with a predetermined team member sends a reject response, program instructions to schedule the event when at least one of a predefined criterion is satisfied, and program instructions to reschedule the event when a predefined number of reject requests are received.

BRIEF DESCRIPTION OF THE DRAWINGS

The preferred embodiments of the invention will hereinafter be described in conjunction with the appended drawings provided to illustrate, and not to limit, the invention, wherein like designations denote like elements, and in which.

DETAILED DESCRIPTION OF THE INVENTION

Figure 1:
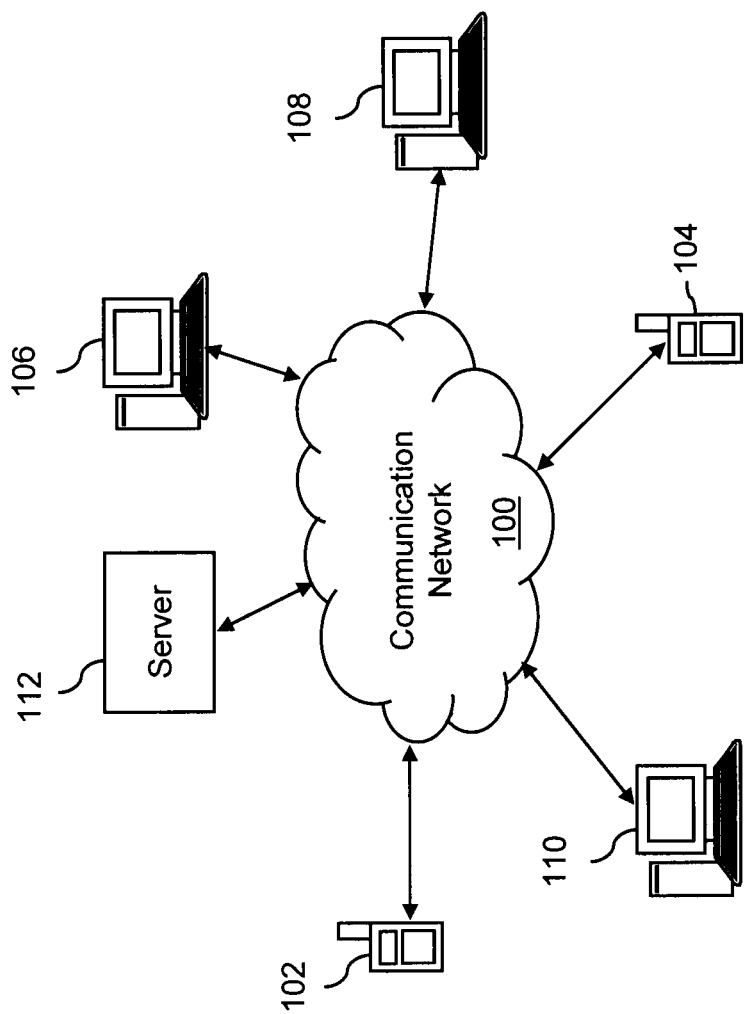
FIG. 1 depicts an environment where the present invention can be practiced.

FIG. 1 depicts an environment where the present invention can be practiced. As shown, different communication devices are connected to each other by a communication network 100. Examples of these communication devices include, but are not limited to, handheld devices 102 and 104; computers 106, 108, and 110; and a server 112. Handheld devices 102 and 104 can be, for example, mobile phones and PDAs.

Typically, communication network 100 can connect communication devices located in proximity with each other and devices which are located at different geographical locations. For example, computers 106 and 108 may be located in any city in India and computer 110 may be located in any city in the US. Similar is the case with server 112. Server 112 may be located at a different country from the devices shown in FIG. 1, but still the devices can access data stored in server 112 through communication network 100.

For instance, it is assumed that the communication devices shown in FIG. 1 (excluding server 112) belong to employees or team members located at different geographical locations and working in a single organization or a project. For example, all the users of the devices shown in FIG. 1 may be a part of a single software project, but may be located in the US, the UK, and India.

For the rest of the description, it is assumed that the users of handheld device 102 and computers 106 and 108 are based out of India, the user of computer 110 is based out of US, and the user of handheld device 104 is located in the UK. Also, it is assumed that these users are working on a single software project and the description below explains how communication is managed between these users, according to the present invention.

Figure 2:
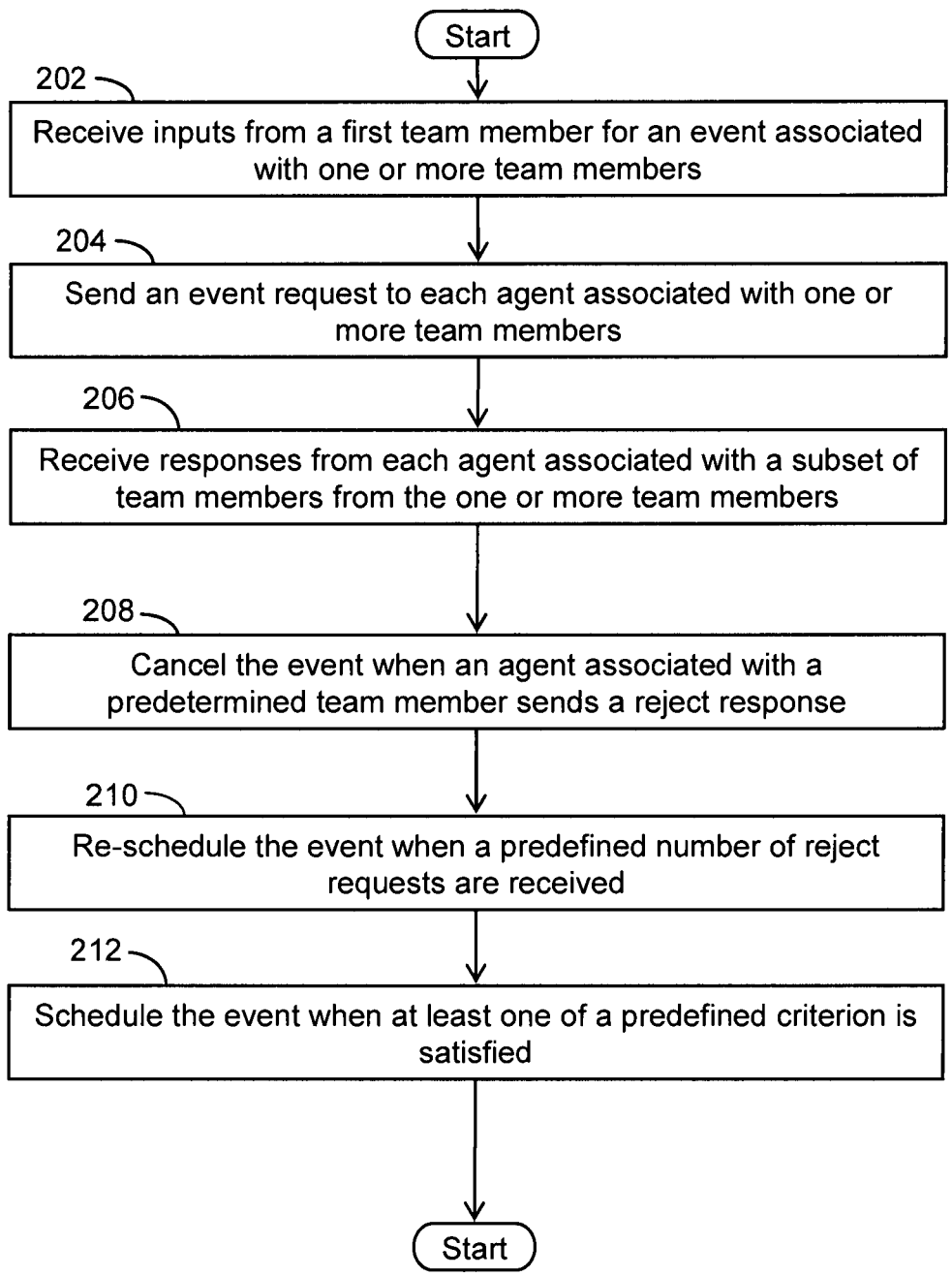
FIG. 2 is a flowchart illustrating a method for managing communication between a plurality of team members, in accordance with an embodiment of the present invention.

FIG. 2 is a flowchart illustrating a method for managing communication between a plurality of team members, in accordance with an embodiment of the present invention. The plurality of team members can be, for example, users of communication devices shown in FIG. 1.

At step 202, inputs are received from a first team member for an event involving one or more team members from the plurality of team members. For example, the first team member can be the user of handheld device 104 and the one or more team members can be the users of computers 106, 108, and 110. Further, the event mentioned above can be, but is not limited to, a conference call or a meeting which would involve all the team members mentioned above. Another example of the event could be a review of a document which the first team member has drafted or written.

Typically, the inputs are received by an "agent" of the first team member. The agent can be a software application which can be installed on the computer, mobile phone, PDA, etc., of the first team member. Further, the inputs which are sent to the agent from the first team member can be, for example, the time of the conference call, the location of the call (for instance, if two of the users are in the same office, the first team member can mention the meeting room number where the call would take place) the "required" and "optional" attendees of the call, the purpose of the call, and the priority of the call (high, medium, or low priority).

At step 204, an event request is sent by the agent of the first team member to the agents of one or more team members. As already mentioned, an "agent" of a team member is a software application installed in his/her communication device. Since it is assumed that the communication devices of the team members are connected to each other through communication network 100, the agents of all the team members are also connected to each other.

In accordance with an embodiment of the present invention, the agent of the first team member (which sends the request to all the other agents) sends the event request by modifying time of the event based on the location of all the other agents and time zone difference. For example, if the first team is located in India and the agent of the first team member receives inputs from the first team member, it is obvious that the first team member will input the time of the event according to the Indian Standard Time (IST). Now, when the agent of the first team members sends the event request to all the other agents, it first identifies where the team members of these agents are located and modifies the time accordingly. For example, if one of the team members receiving the request is located in the UK, the agent of the first team member modifies the time of the event in the sent event request based on the UK local time.

At step 206, responses are received by the agent of the first team member from each agent associated with a subset of team members of the one or more team members. In accordance with an embodiment of the present invention, the subset of team members include those team members which are "offline". For the sake of description of FIG. 2, a team member is said to be "offline" if the team member is not available to respond to the event request himself/herself (for example, if he/she is on leave or away from his/her workstation) or due to lack of connectivity.

Typically, for the team members which are offline, the agents (of these team members) themselves decide the response which should be sent to the agent of the first team member and send the response accordingly. The entire process of sending response by an agent of a team member who is offline is explained in FIG. 3.

In accordance with an embodiment of the present invention, the agent of the first team member also receives responses from team members who are "online". For example, a member who is able to access his/her email may reply to the event request himself/herself, without requiring his/her agent to intervene.

At step 208, the event is cancelled by the agent of the first team member when an agent associated with a predetermined team member sends a reject response. In accordance with an embodiment of the present invention, the predetermined team member can be, for example, an important person without which the event could not be conducted. As an example, if the event is a project status update call, the important person can be the project manager of the project.

Those ordinarily skilled in the art will appreciate that the agent of the first team member can also cancel the event when the predetermined person sends the reject response himself/herself and is not received by his/her agent (for example, when the person is online).

At step 210, the event is rescheduled by the agent of the first team member when a predefined number of reject responses are received. Typically, the rescheduling is done based on the responses received by the agent of the first team member. As already stated, even if the agent receives all "accept" responses and only the important person sends the "reject" response, the event is cancelled and not rescheduled. However, if, for example, five "unimportant" team members send reject requests, the agent of the first team member tries to reschedule the event.

The scenario mentioned above is for an event which has a "high" priority. For events of "low" priority, the agents of team members (whether important or unimportant) send the rescheduling request and no reject response is sent to the agent of the first team member.

Based on all the rescheduling requests received by the agent of the first team member, the agent reschedules the event to a time slot which is comfortable to all or most of the team members involved in the event.

In accordance with an embodiment of the present invention, the process of rescheduling is done by the agents only, without the involvement of the team members. As an example, when the meeting is to be re-scheduled, the agents determine available time slots for the meeting from team members' calendars and schedule the meeting at a time which is acceptable to all (or most) of the team members. To reschedule, the agents use any known scheduling algorithm.

At step 212, the event is scheduled as per the time slot sent by the agent of the first team member when a predefined criterion is satisfied. The predefined criterion can be, for example, all the responses received by the agent are "accept" responses, or reject or rescheduling responses are received only from unimportant team members and that too few in numbers.

Figure 3:
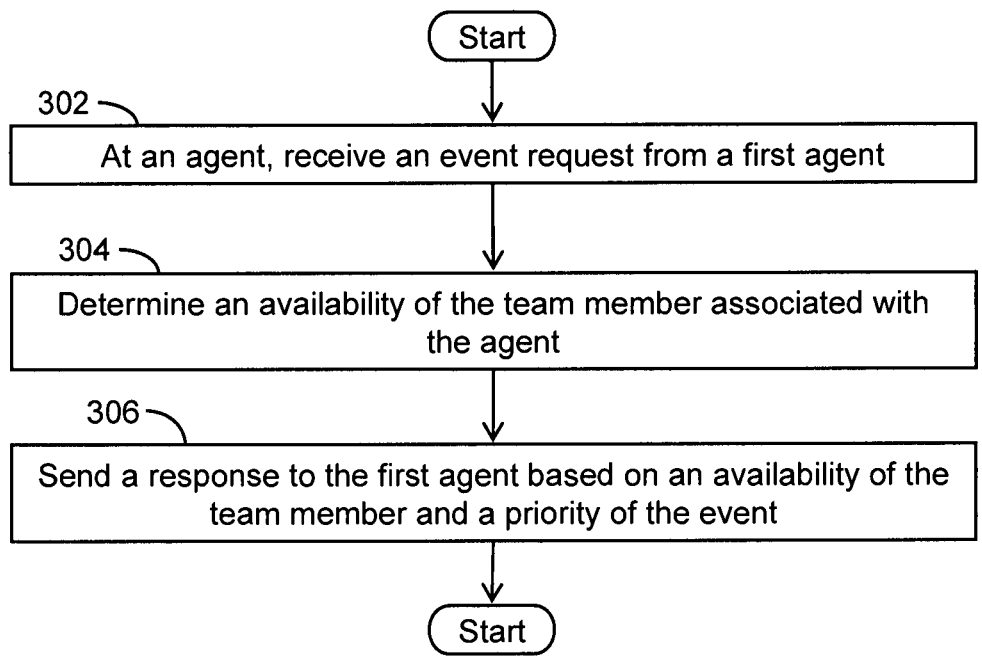
FIG. 3 is a flowchart illustrating a method for sending a response for a received event request, in accordance with an embodiment of the present invention.

FIG. 3 is a flowchart illustrating a method for sending a response for a received event request, in accordance with an embodiment of the present invention. At step 302, an event request is received by an agent from a first agent, which can be, for example, the agent associated with a first team member (as explained in the description of last figure).

Once the event request is received by the agent, at step 304, the agent determines the availability of the team member associated with it for the event. The agent does this by checking the calendar of the team member and determining whether the team member is free for the event at the time mentioned in the event request.

At step 306, the agent sends a response to the first agent, based on the availability of the team member and the priority of the event. In accordance with an embodiment of the present invention, the agent sends an "accept" response when the team member is available for the event and sends a "reject" response when the team member is not available for the event and the priority of the event is "high". Further, the agents send a "re-schedule" response to the first agent when the team member is not available and the priority of the event is "low".

Figure 4:
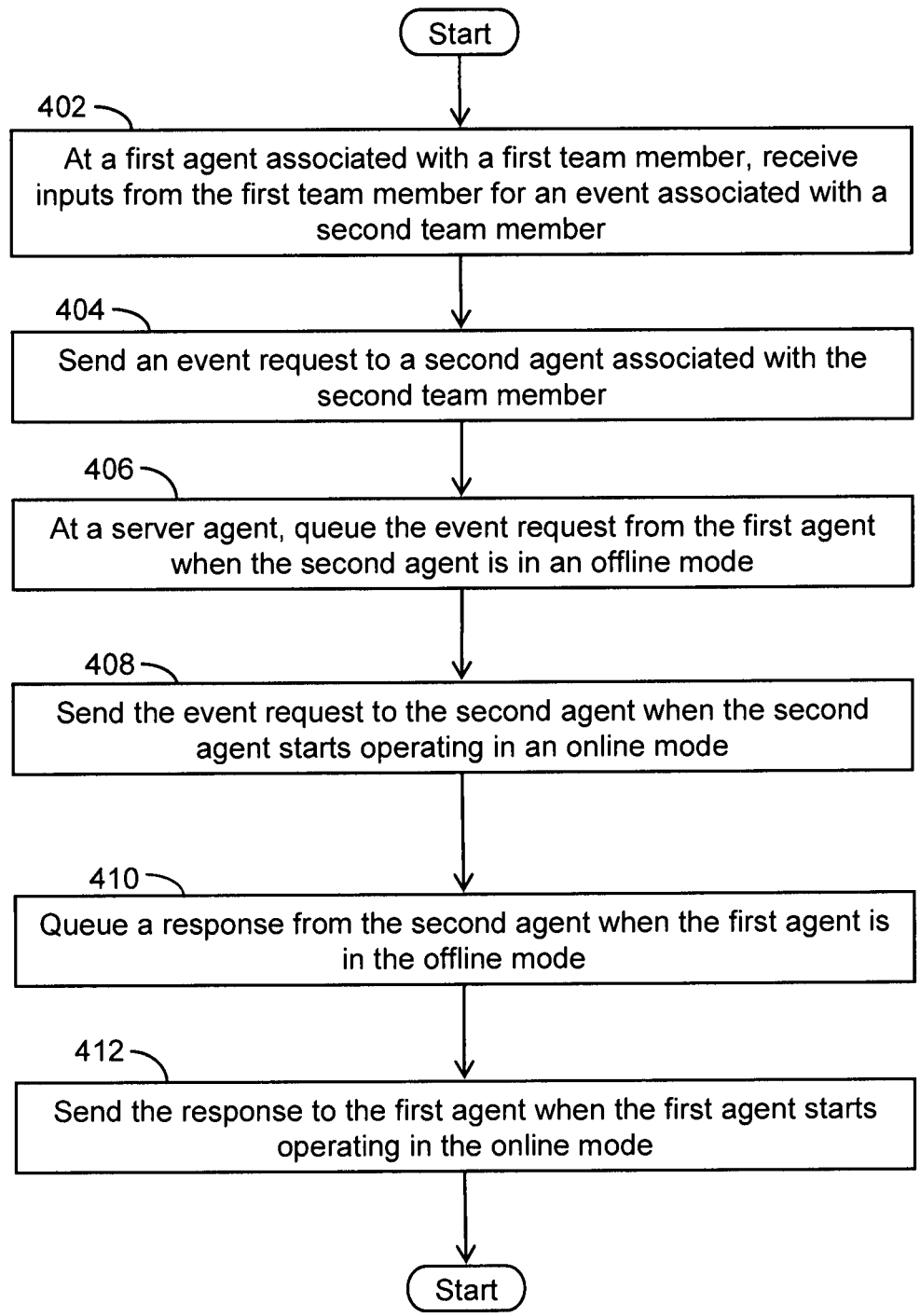
FIG. 4 is a flowchart illustrating a method for managing communication between a plurality of team members, in accordance with another embodiment of the present invention.

FIG. 4 is a flowchart illustrating a method for managing communication between a plurality of team members, in accordance with another embodiment of the present invention. At step 402, inputs are received at a first agent associated with a first team member for an event associated with a second team member. As an example, the first team member may want to have a call or meeting with the second team member, or he/she may have a document which needs to be reviewed by the second team member.

At step 404, an event request is sent by the first agent to a second agent associated with the second team member. As stated in the description of FIG. 2, the event request contains at least one of the time of the event, the location of the event, the purpose of the event, and a priority of the event.

At step 406, a server agent queues the event request received from the first agent when the second agent is in offline mode. In accordance with an embodiment of the present invention, the second agent is said to be in offline mode when the device containing the second agent is disconnected from the communication network. Disconnection may be due to some technical problem or the user of the device containing the second agent may himself/herself switch off the device (for example, the user can switch off his/her mobile phone which may contain the second agent). Disconnection may also be due to loss of network connectivity when the user is driving.

At step 408, the server agent sends the event request to the second agent when the second agent starts operating in online mode. As an example, when the connection between the second agent and the network is restored, the server agent sends the event request to the second agent.

Once the second agent receives the event request, it sends a response to the first agent based on the availability of the second team member and a priority of the event. As already mentioned in FIG. 3, the second agent sends an accept response when the second team member is available for the event and sends a reject response when the second team member is not available for the event and the priority of the event is high. Also, it sends a reschedule response when the second team member is not available for the event and the priority of the event is low.

At step 410, the response sent by the second agent is queued by the server agent when the first agent is in the offline mode. At step 412, the server agent sends the queued response to the first agent when the first agent starts operating in online mode.

Figure 5:
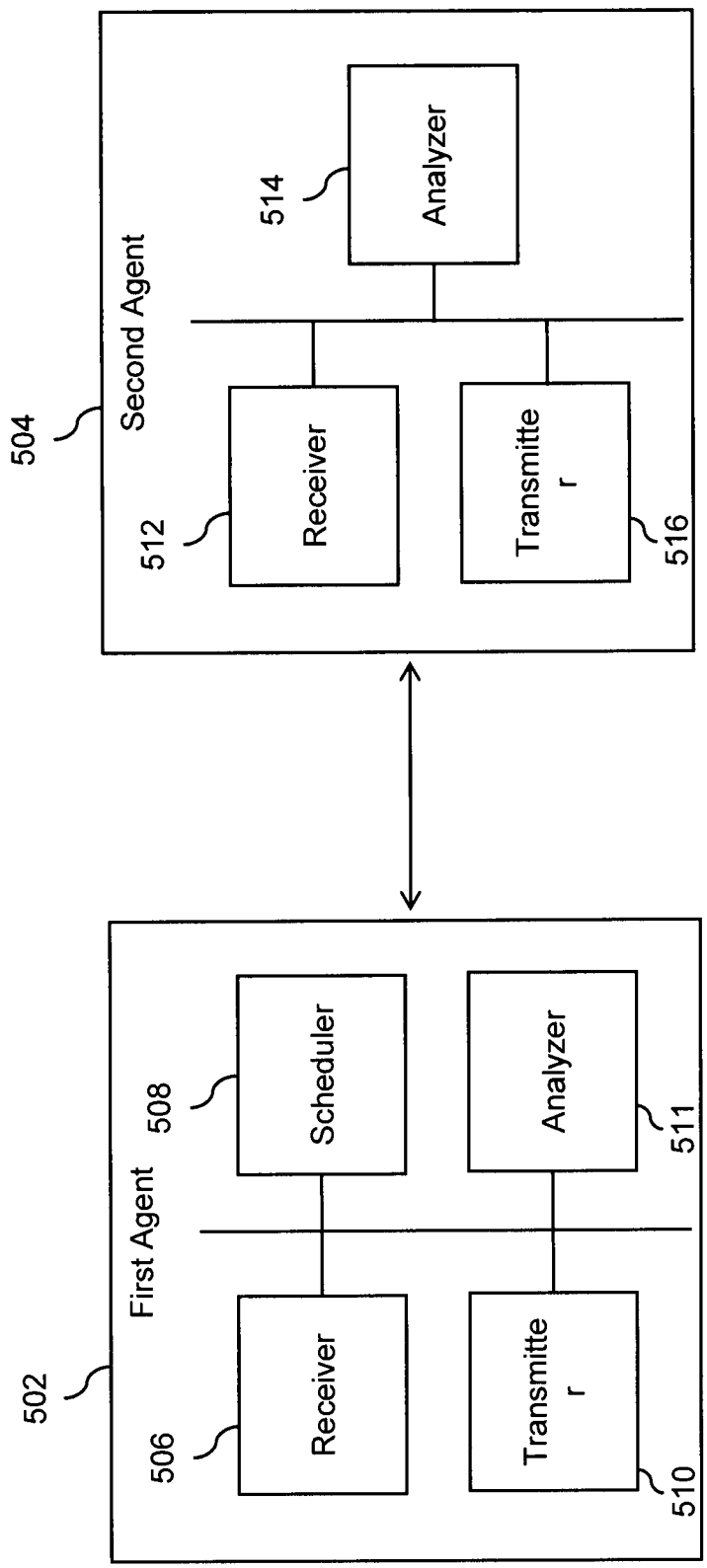
FIG. 5 is a block diagram of a first agent and a second agent, in accordance with an embodiment of the present invention.

FIG. 5 is a block diagram of a first agent 502 and a second agent 504, in accordance with an embodiment of the present invention. For the sake of description of FIG. 5, it is assumed that first agent 502 is the agent which sends an event request to second agent 504. It will be appreciated by a person ordinarily skilled in the art that essentially first agent 502 and second agent 504 are similar to each other and have the same elements. However, for the sake of simplicity, first agent 502 is shown to include only those elements which are essential to send an event request and second agent 504 is shown to include only those elements which are essential for receiving the request and sending the response to it.

In accordance with an embodiment of the present invention, first agent 502 is installed in a first communication device (not shown) owned by a first team member and second agent 504 is installed in a second communication (not shown) owned by a second team member. The communication device can be, for example, a mobile phone, a computer, and a PDA. For the description of FIG. 5, it is assumed that the second team member is offline, i.e., not able to respond to event requests on his/her own and his/her agent sends responses to any received requests on his/her behalf.

As shown, first agent 502 includes a receiver 506, a scheduler 508, a transmitter 510 and an analyzer 511; and second agent 504 includes a receiver 512, an analyzer 514, and a transmitter 516. Receiver 506 is configured to receive inputs from the first team member for an event associated with one or more team members. The event can be, for example, a meeting or a call between the first team member and the one or more team members or a review of a document prepared by the first team member by the one or more team members.

Once the inputs are received by receiver 506, transmitter 510 sends an event request to each agent associated with the one or more team members. Second agent 504 is an example of one such agent. The event request can contain the time of the event, the location of the event, the purpose of the event, and a priority of the event. As already mentioned in FIG. 2, first agent 502 modifies the time of the meeting for each agent based on the geographical location of the team members associated with the agents.

At second agent 504, receiver 512 receives the event request from first agent 502 and analyzer 514 determines the availability of the team member associated with the second team member based on the time of the event mentioned in the event request. Once analyzer 514 determines the availability of the second team member, transmitter 516 sends a response to first agent 502 based on the determined availability and the priority of the event.

In accordance with an embodiment of the present invention, transmitter 516 sends an accept response when the second team member is available for the event and sends a reject response when the team member is not available and the priority of the event is high. A reschedule response is sent when the team member is not available for the event and the priority of the event is low.

Once response from second agent 504 is received by first agent 502, analyzer 511 analyzes the received response and scheduler 508 either cancels the event, reschedules the event or schedules the event at the stipulated time based on the analysis. In particular, scheduler 508 cancels the event when analyzer 511 determines that an agent associated with an important team member sends a reject response. For example, if the second team member is important to the event and if his/her agent sends a reject response, scheduler 508 cancels the event. If, on the contrary, analyzer 511 determines that first agent 502 has received all accept responses or reject responses are received only from unimportant team members, scheduler 508 schedules the event.

Scheduler 508 reschedules the event when a predefined number of reject responses are received and none of the reject responses are from important team members.

Figure 6:
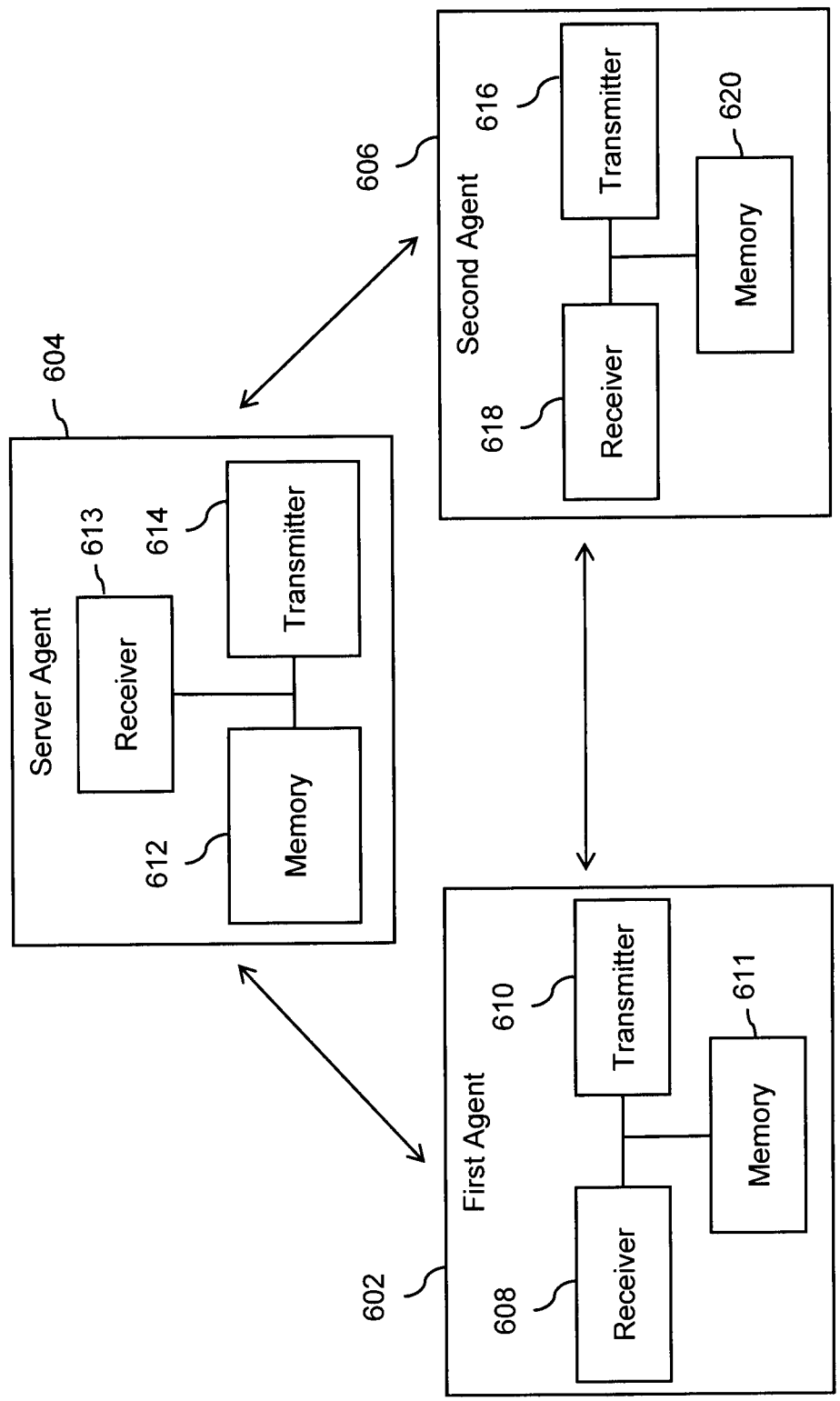
FIG. 6 is a block diagram illustrating communication between a first agent, a server agent, and a second agent, in accordance with an embodiment of the present invention.

FIG. 6 is a block diagram illustrating communication between a first agent 602, a server agent 604, and a second agent 606, in accordance with an embodiment of the present invention.

As shown, first agent 602 includes a receiver 608 a transmitter 610 and a memory 611; second agent 606 includes a transmitter 616, a receiver 618 and a memory 620; and server agent 604 includes a memory 612, a receiver 613 and a transmitter 614.

Receiver 608 receives inputs from the team member associated with first agent 602 for an event involving a second team member (who is associated with second agent 606). Once the inputs are received by receiver 608, transmitter 610 sends an event request to second agent 606. For the description of FIG. 6, it is assumed that second agent 606 is in offline mode, i.e., the communication device having second agent 606 is either switched off or is disconnected from the network.

Since second agent 606 is in offline mode, the event request is received by receiver 613 of server agent 604, which stores it in memory 612. After that, whenever second agent 606 comes back in online mode, it informs server agent 604 about its online status and then transmitter 614 sends the event request stored in memory 612 to second agent 606.

At second agent 606, receiver 618 receives the request, and second agent 606 determines the availability of the team member associated with second agent 606 for the event. Based on the availability, transmitter 616 sends a response to first agent 602. In case second agent 606 is in offline mode, the response is stored in memory 620 and is sent to first agent 602 when second agent 606 starts working on online mode again.

Further, in case first agent 602 is in offline mode, the response is sent to server agent 604 which stores it temporarily, and then forwards it to first agent 602 when it comes back on online mode. At first agent 602, response is received by receiver 608 and the event is rescheduled, cancelled or scheduled as planned based on the received response. In accordance with an embodiment of the present invention, first agent 602 stores the received response in memory 611 and reschedules, cancels or schedules the event when it comes back in online mode.

Various embodiments of the present invention provide various advantages. Firstly, a team member is able to respond to the meeting requests he/she receives even if he/she is not able to "personally" respond to the requests. Secondly, even if the agent associated with the team member is in offline mode (for example, due to some technical problem), the meeting request is stored in a centralized server which forwards the request to the agent when it comes back in online mode. This way, no meeting request is left unanswered even if network connection is lost temporarily.

The method and the system for managing communication between a plurality of team members, as described in the present invention, may be embodied in the form of a computer system. Typical examples of a computer system include a general-purpose computer, a programmed microprocessor, a micro-controller, a peripheral integrated circuit element, and other devices or arrangements of devices that are capable of implementing the steps that constitute the method for the present invention.

The computer system typically comprises a computer, an input device, and a display unit. The computer typically comprises a microprocessor, which is connected to a communication bus. The computer also includes a memory, which may include a Random Access Memory (RAM) and a Read Only Memory (ROM). Further, the computer system comprises a storage device, which can be a hard disk drive or a removable storage drive such as a floppy disk drive and an optical disk drive. The storage device can be other similar means for loading computer programs or other instructions into the computer system.

The computer system executes a set of instructions that are stored in one or more storage elements to process input data. These storage elements can also hold data or other information, as desired, and may be in the form of an information source or a physical memory element present in the processing machine. Exemplary storage elements include a hard disk, a DRAM, an SRAM, and an EPROM. The storage element may be external to the computer system and connected to or inserted into the computer, to be downloaded at or prior to the time of use. Examples of such external computer program products are computer-readable storage mediums such as Blue ray disks, DVD, CD-ROMS, Flash chips, and floppy disks.

The set of instructions may include various commands that instruct the processing machine to perform specific tasks such as the steps that constitute the method for the present invention. The set of instructions may be in the form of a software program. The software may be in various forms such as system software or application software. Further, the software may be in the form of a collection of separate programs, a program module with a large program, or a portion of a program module. The software may also include modular programming in the form of object-oriented programming. The software program that contains the set of instructions can be embedded in a computer program product for use with a computer, the computer program product comprising a computer-usable medium with a computer-readable program code embodied therein. The processing of input data by the processing machine may be in response to users' commands, results of previous processing, or a request made by another processing machine.

The modules described herein may include processors and program instructions that are used to implement the functions of the modules described herein. Some or all the functions can be implemented by a state machine that has no stored program instructions, or in one or more Application-specific Integrated Circuits (ASICs), in which each function or some combinations of some of the functions are implemented as custom logic.

While the various embodiments of the invention have been illustrated and described, it will be clear that the invention is not limited only to these embodiments. Numerous modifications, changes, variations, substitutions, and equivalents will be apparent to those skilled in the art, without departing from the spirit and scope of the invention.

What is claimed is:

1. A method comprising:
    sending, by a communication management computing device, one or more event requests to a plurality of computing devices associated with the one or more team members, wherein the one or more event requests comprise a request to attend an event;
    receiving, the communication management computing device, one or more responses to the sent one or more event requests from at least one of the plurality of computing devices associated with the one or more team members, wherein each of the one or more responses comprises an acceptance parameter and corresponding acceptance value to indicate when the request to attend the event was accepted and a team member status indicator and corresponding team member status value to indicate the status of the corresponding one or more team members;
    determining, by the communication management computing device, for the one or more responses with a team member status value exceeding a status threshold, when the number of the one or more responses comprising the acceptance value indicating that the request to attend the event was accepted exceeds a predetermined acceptance threshold; and
    performing, by the communication management computing device, one or more event management actions when the predetermined acceptance threshold has been exceeded.

2. The method of claim 1, wherein the event comprises a meeting between the one or more team members or a review of a document sent by the one or more team members.

3. The method of claim 1, wherein the one or more event requests comprises a time for the event, a location for the event, a purpose for the event, or a priority of the event.

4. The method of claim 3, further comprising:
    determining, by the communication management computing device, a time zone associated with each of the one or more team members; and
    estimating, by the communication management computing device, the time for the event based on the determined time zone of the one or more team members.

5. A communication management computing device comprising:
    a processor;
    a memory coupled to the processor which is configured to be capable of executing programmed instructions, which comprise the programmed instructions stored in the memory to:
        send one or more event requests to a plurality of computing devices associated with one or more team members, wherein the one or more event requests comprise a request to attend an event;
        receive one or more responses to the sent one or more event requests from at least one of the plurality of computing devices associated with the one or more team members, wherein each of the one or more responses comprises an acceptance parameter and corresponding acceptance value to indicate when the request to attend the event was accepted and a team member status indicator and corresponding team member status value to indicate the status of the corresponding one or more team members;
        determine, for the one or more responses with a team member status value exceeding a status threshold, when the number of the one or more responses comprising the acceptance value indicating that the request to attend the event was accepted exceeds a predetermined acceptance threshold; and perform one or more event management actions when the predetermined acceptance threshold has been exceeded.

6. The device of claim 5, wherein the event comprises a meeting between the one or more team members or a review of a document sent by the one or more team members.

7. The device of claim 5, wherein the event request comprises a time for the event, a location for the event, a purpose for the event, or a priority of the event.

8. The device of claim 7, wherein the wherein the processor is further configured to be capable of executing the programmed instructions, which comprise the programmed instructions stored in the memory to:

determine a time zone associated with each of the one or more team members; and estimating, by the communication management computing device, the time for the event based on the determined time zone of the one or more team members.

9. A non-transitory computer readable medium having stored thereon instructions for generating a series of still images comprising machine executable code which when executed by at least one processor, causes the processor to perform steps comprising:

sending one or more event requests to a plurality of computing devices associated with one or more team members, wherein the one or more event requests comprise a request to attend an event;

receiving one or more responses to the sent one or more event requests from at least one of the plurality of computing devices associated with the one or more team members, wherein each of the one or more responses comprises an acceptance parameter and corresponding acceptance value to indicate when the request to attend the event was accepted and a team member status indicator and corresponding team member status value to indicate the status of the corresponding one or more team members;

determining, for the one or more responses with a team member status value exceeding a status threshold, when the number of the one or more responses comprising the acceptance value indicating that the request to attend the event was accepted exceeds a predetermined acceptance threshold; and performing one or more event management actions when the predetermined acceptance threshold has been exceeded.

10. The medium of claim 9, wherein the event comprises a meeting between the one or more team members or a review of a document sent by the one or more team members.

11. The medium of claim 9, wherein the event request comprises a time for the event, a location for the event, a purpose for the event, or a priority of the event.

12. The medium of claim 11, further having stored thereon instructions that when executed by the processor cause the processor to perform steps further comprising:

determining a time zone associated with each of the one or more team members; and estimating, by the communication management computing device, the time for the event based on the determined time zone of the one or more team members.

13. The medium of claim 9, wherein the one or more event management actions comprises sending an indication that the event has been accepted, sending an indication that the event has been cancelled, or sending an indication that the event has been rescheduled.

14. The medium of claim 9, further having stored thereon instructions that when executed by the processor cause the processor to perform steps further comprising:

designating one of the one or more team members as a team leader; and cancelling the event when the acceptance value corresponding to the designated team leader indicates that the request to attend the event was not accepted.

15. The medium of claim 9, further having stored thereon instructions that when executed by the processor cause the processor to perform steps further comprising:

obtaining an availability time from the plurality of computing devices associated with the one or more team members; and scheduling the event based on the obtained availability time.

16. The method of claim 1, wherein the one or more event management actions comprises sending an indication that the event has been accepted, sending an indication that the event has been cancelled, or sending an indication that the event has been rescheduled.

17. The method of claim 1, further comprising:

designating, by the communication management computing device, one of the one or more team members as a team leader; and cancelling, by the communication management computing device, the event when the acceptance value corresponding to the designated team leader indicates that the request to attend the event was not accepted.

18. The method of claim 1, further comprising:

obtaining, by the communication management computing device, an availability time from the plurality of computing devices associated with the one or more team members; and scheduling, by the communication management computing device, the event based on the obtained availability time.

19. The device of claim 5, wherein the one or more event management actions comprises sending an indication that the event has been accepted, sending an indication that the event has been cancelled, or sending an indication that the event has been rescheduled.

20. The device of claim 5, wherein the processor is further configured to be capable of executing the programmed instructions, which comprise the programmed instructions stored in the memory to:

designate one of the one or more team members as a team leader; and cancel the event when the acceptance value corresponding to the designated team leader indicates that the request to attend the event was not accepted.

21. The device of claim 5, wherein the processor is further configured to be capable of executing the programmed instructions, which comprise the programmed instructions stored in the memory to:

obtain an availability time from the plurality of computing devices associated with the one or more team members; and schedule the event based on the obtained availability time.

* * * * *